US012325098B1

(12) United States Patent
Sun et al.

(10) Patent No.: US 12,325,098 B1
(45) Date of Patent: Jun. 10, 2025

(54) MULTI-TASK MACHINING PROCESS ON-LINE MONITORING METHOD AND SYSTEM BASED ON CLOUD-EDGE COLLABORATION

(71) Applicant: DALIAN UNIVERSITY OF TECHNOLOGY, Liaoning (CN)

(72) Inventors: Yuwen Sun, Liaoning (CN); Shichao Yan, Liaoning (CN); Liang Sui, Liaoning (CN); Shuoxue Sun, Liaoning (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 0 days.

(21) Appl. No.: 19/057,359

(22) Filed: Feb. 19, 2025

(30) Foreign Application Priority Data

Jul. 30, 2024 (CN) .......................... 202411025298.1

(51) Int. Cl.
*B23Q 15/12* (2006.01)
*G05B 19/4065* (2006.01)

(52) U.S. Cl.
CPC ......... *B23Q 15/12* (2013.01); *G05B 19/4065* (2013.01)

(58) Field of Classification Search
None
See application file for complete search history.

(56) References Cited

U.S. PATENT DOCUMENTS

2024/0036543 A1\* 2/2024 Zhang ................. G05B 19/404

\* cited by examiner

*Primary Examiner* — Ryan A Jarrett
(74) *Attorney, Agent, or Firm* — MUNCY, GEISSLER, OLDS & LOWE, P.C.

(57) ABSTRACT

The present invention discloses a multi-task machining process on-line monitoring method and system based on cloud-edge collaboration, comprising multi-source sensing terminals, edge computing platforms and a cloud server. Each multi-source sensing terminal uses sensing equipment to obtain multi-source heterogeneous signals such as spindle vibration signals and acoustic emission signals generated in a machining process and transmit the signals to a controller of each edge computing platform; the edge computing platform is used for periodically collecting and processing the signals, synchronously monitoring cutting vibration, tool wear, tool breakage and machining surface quality in combination with intelligent prediction models, and uploading monitoring data to the cloud server; the cloud server is used for storing the monitoring data of each edge computing platform into the cloud database, and updating the intelligent prediction models regularly with global data to improve the generalization ability of the models.

7 Claims, 3 Drawing Sheets

MULTI-TASK MACHINING PROCESS ON-LINE MONITORING METHOD AND SYSTEM BASED ON CLOUD-EDGE COLLABORATION

TECHNICAL FIELD

The present invention belongs to the technical field of intelligent manufacturing, and relates to a multi-task machining process on-line monitoring method and system based on cloud-edge collaboration.

BACKGROUND

With the continuous increase of the comprehensive performance requirements of equipment in the fields such as energy, power and aerospace, complex thin-walled structural parts with light weight and high specific strength, such as aviation transparent structural parts, engine casings, blisks and air wave cooling hubs, have been widely used. However, due to the fact that such structural parts have large sizes, thin walls and low stiffness, and are generally made of difficult-to-machine materials or heat-sensitive materials such as titanium alloy, high-strength steel, high-temperature alloys and oriented organoglass, the problems such as cutting flutter, tool failure and surface quality degradation are easy to occur in a machining process, which results in difficulty in guaranteeing the machining accuracy and sharp drop in the production efficiency, and even causes a damage to a machine tool.

An on-line machining process monitoring system can be used to sense a cutting vibration state, a tool health state and machining surface quality in real time, and provide a guidance for adaptive control of a cutting process, so as to realize high-quality and high-efficiency machining of the complex thin-walled structural parts. In a traditional machining monitoring system, a machining state is predicted in real time through a local computing platform; however, in the case of massive monitoring data, the storage capacity of this kind of system is limited, and it is difficult to realize sharing of monitoring data and prediction models among different machine tools. In recent years, with the development of Internet of Things, cloud computing and edge computing technology, machining monitoring systems based on cloud-edge collaboration have been proposed in succession. For example, an invention patent CN115034504A relates to a tool wear state predicting system and method based on cloud-edge collaborative training, by which a tool wear state is monitored in real time through prediction models deployed on an edge side, and the prediction models are updated and trained in a cloud to improve the tool wear state monitoring accuracy. In summary, the existing cloud-edge collaborative machining monitoring system usually has a single function, by which only a certain cutting state is monitored, whereas the machining quality of a workpiece in actual production is affected by many factors such as the cutting vibration state and the tool health state; at present, no machining monitoring system with multi-state monitoring capability is available; in addition, the above system only uses a cloud server to update and train machining prediction models, but fails to give full play to the powerful cloud storage function thereof, and no big data platform for machining monitoring has been formed, so that it is difficult to meet the needs of intelligent machining monitoring.

SUMMARY

In view of the defects of the existing machining process monitoring system, the present invention provides a multi-task machining process on-line monitoring method and system based on cloud-edge collaboration, so as to realize synchronous monitoring of multiple processing states and information sharing among different machine tools.

The technical solution of the present invention is as follows:

A multi-task machining process on-line monitoring system based on cloud-edge collaboration, comprising multi-source sensing terminals, edge computing platforms and a cloud server, wherein:

Each multi-source sensing terminal is deployed on a machine tool, and is used for obtaining multi-source heterogeneous signals generated in a machining process and transmitting the signals to each edge computing platform;

The edge computing platform is built based on a CompactRIO embedded controller and a host computer, which is used for periodically collecting and processing the multi-source heterogeneous signals, monitoring a cutting machining process in real time in combination with intelligent prediction models, and uploading monitoring data to the cloud server;

The cloud server is used for storing the monitoring data sent by the edge computing platform, and updating and issuing the intelligent prediction models.

The multi-source sensing terminal comprises an acceleration sensor, a sound pressure sensor, an acoustic emission sensor, a preamplifier, a sound vibration input module and a voltage input module, and the multi-source heterogeneous signals obtained include the spindle vibration signals, the sound signals and the acoustic emission signals.

The edge computing platform comprises a signal collection module, a signal preprocessing module, a feature extraction module, a feature fusion module, a multi-task monitoring module, a data storage module, a man-machine interaction module and a cloud upload module; the signal collection module is used for collecting spindle vibration signals, sound signals and acoustic emission signals obtained by the multi-source sensing terminal at a preset sampling frequency, and transmitting the above signals to the signal preprocessing module; the signal preprocessing module is used for low-pass filtering of the collected spindle vibration signals and sound signals, and band-pass filtering of the collected acoustic emission signals; the feature extraction module is used for extracting time domain, frequency domain and time-frequency domain features from the filtered multi-source heterogeneous signals; the feature fusion module is used for reducing the dimensionality of the extracted time domain, frequency domain and time-frequency domain features; the multi-task monitoring module comprises a vibration monitoring sub-module, a tool wear monitoring sub-module, a tool breakage monitoring sub-module and a machining quality monitoring sub-module; cutting vibration, tool wear, tool breakage and machining surface roughness are monitored by the above sub-modules according to respective intelligent prediction models; the data storage module is used for storing the multi-source heterogeneous signals preprocessed, the signal features extracted and the monitoring results to the host computer, so as to facilitate the playback of historical monitoring data and the tracing of processing anomalies; the man-machine interaction module comprises a parameter setting interface and a monitoring visualization interface, the parameter setting interface is used for the configuration of various monitoring parameters and cloud server information, and the monitoring visualization interface is used for the real-time display of the signals, the features and the monitoring results; the cloud upload module is used for uploading the feature data and monitoring results stored in the host computer to the cloud server through a MQTT protocol.

The signal collection module is deployed in a FPGA chassis of the CompactRIO embedded controller, and the signal preprocessing module and the feature extraction module are deployed in an RT controller of the CompactRIO embedded controller; the feature fusion module, the multi-task monitoring module, the data storage module, the man-machine interaction module and the cloud upload module are deployed in the host computer; data is transmitted between the FPGA chassis and the RT controller in a DMA FIFO mode, and data is transmitted between the CompactRIO embedded controller and the host computer through a network stream protocol.

The CompactRIO embedded controller and the host computer are developed based on a LabVIEW software platform, and a producer/consumer mode is adopted for LabVIEW program design, so as to improve the program operation efficiency and ensure the timeliness of the machining monitoring system; the signal collection module is a producer, and the signal preprocessing module, the feature extraction module, the feature fusion module, the multi-task monitoring module, the data storage module, the man-machine interaction module and the cloud upload module are consumers.

The intelligent prediction models of the vibration monitoring sub-module, the tool wear monitoring sub-module, the tool breakage monitoring sub-module and the machining quality monitoring sub-module are built by an on-line sequential extreme learning machine or a support vector machine, the inputs of the models are features after dimensionality reduction by the feature fusion module, and the outputs are a vibration state, a tool wear state, a tool breakage state and machining surface roughness, respectively; each intelligent prediction model is realized in a MATLAB Script node of Lab VIEW.

The cloud server comprises a cloud database module and a cloud model update module; the cloud database module comprises a knowledge database and a feature database, the knowledge database is used for storing the intelligent prediction model of each sub-module of the multi-task monitoring module, and the feature database is used for storing the feature data and monitoring results sent by each edge computing platform; the cloud model update module is used for updating and training the intelligent prediction model of each sub-module of the multi-task monitoring module when global data of the feature database reaches a set threshold, storing the updated model parameters in the knowledge database of the cloud database module, and issuing the model to each edge computing platform at the same time.

A multi-task machining process on-line monitoring method based on cloud-edge collaboration, comprising the following steps:

S1. Program deployment and setting; deploying a Lab VIEW program of the edge computing platform, and setting a sampling frequency, a data storage path, cloud server information, etc. in the man-machine interaction module;

S2. Multi-source heterogeneous signal collection; using the signal collection module to collect spindle vibration signals, sound signals and acoustic emission signals obtained by the multi-source sensing terminal at a preset sampling frequency, and transmit the signals collected to the signal preprocessing module;

S3. Signal filtering and multi-domain feature extraction; using the signal preprocessing module to filter the collected three-directional spindle vibration signals, sound signals and acoustic emission signals, inputting the filtered data to the feature extraction module to extract time domain features, frequency domain features and time-frequency domain features therefrom, and on this basis, transmitting the filtered multi-source heterogeneous signals and the extracted multi-domain signal features to the host computer through a network stream protocol;

S4. Feature fusion and multi-task machining monitoring; using the host computer to input the read feature data to the feature fusion module for dimensionality reduction, and then input the low dimensional features to the multi-task monitoring module to predict a cutting vibration state, a tool wear state, a tool breakage state and machining surface roughness;

S5. Data visualization and local storage; transmitting the filtered signals, the extracted features and the monitoring results to the man-machine interaction module and the data storage module for real-time display and storage in a text file under a specified path;

S6. Repeating steps S2-S5 until the end of a machining monitoring process;

S7. Data cloud upload; after machining monitoring is ended, using the cloud upload module to read the text file used for storing the feature data and the monitoring results in the host computer, send the read data to the cloud server through a MQTT protocol, and delete the corresponding text file to release the disk space of the host computer after the data is successfully uploaded;

S8. Cloud database storage; using the cloud server to accept the feature and prediction data sent by each edge computing platform, and store the data in a specified feature database;

S9. Model cloud update and issuing; using the cloud model update module to regularly access the feature database, respectively train the intelligent prediction models of the vibration monitoring sub-module, the tool wear monitoring sub-module, the tool breakage monitoring sub-module and the machining quality monitoring sub-module when global data increment of the feature database reaches a set threshold, store the updated model parameters in the knowledge database, and issue the parameters to the host computer of each edge computing platform at the same time through the MQTT protocol.

The present invention has the following beneficial effects: the present invention is oriented to the technical field of intelligent manufacturing, and builds a multi-task machining process on-line monitoring system, and accordingly proposes a multi-task machining process monitoring method based on cloud-edge collaboration. Using the edge computing platforms, the present invention can realize synchronous monitoring of the cutting vibration, the tool wear, the tool breakage and the machining surface quality, and has high computing efficiency and good monitoring timeliness. At the same time, using the cloud server built, the present invention can realize high-efficiency storage of massive monitoring data and iterative update of the intelligent prediction models, which eliminates the information islands among different machine tools and further improves the machining monitoring accuracy.

DESCRIPTION OF DRAWINGS

In the figures: 1 machine tool; 11 spindle of machine tool; 12 workbench of machine tool; 2 multi-source sensing terminal; 21 three-axis acceleration sensor; 22 acoustic emission sensor; 23 sound pressure sensor; 24 preamplifier; 25 sound vibration input module; 26 voltage input module; 3 edge computing platform; 31 CompactRIO embedded controller; 32 host computer; 4 cloud server; 5 workpiece fixture; 6 magnetic fixture; 7 magnetic stand; 8 DC power supply.

DETAILED DESCRIPTION

To make the purpose, the technical solution and advantages of the present invention more clear, the technical solution in the embodiments of the present invention will be clearly and fully described below in combination with the drawings in the embodiments of the present invention. Apparently, the embodiments described are merely part of the embodiments of the present invention, not all of the embodiments. Based on the embodiments in the present invention, all other embodiments obtained by those ordinary skilled in the art without contributing creative labor will belong to the protection scope of the present invention.

Embodiment 1

Figure 1:
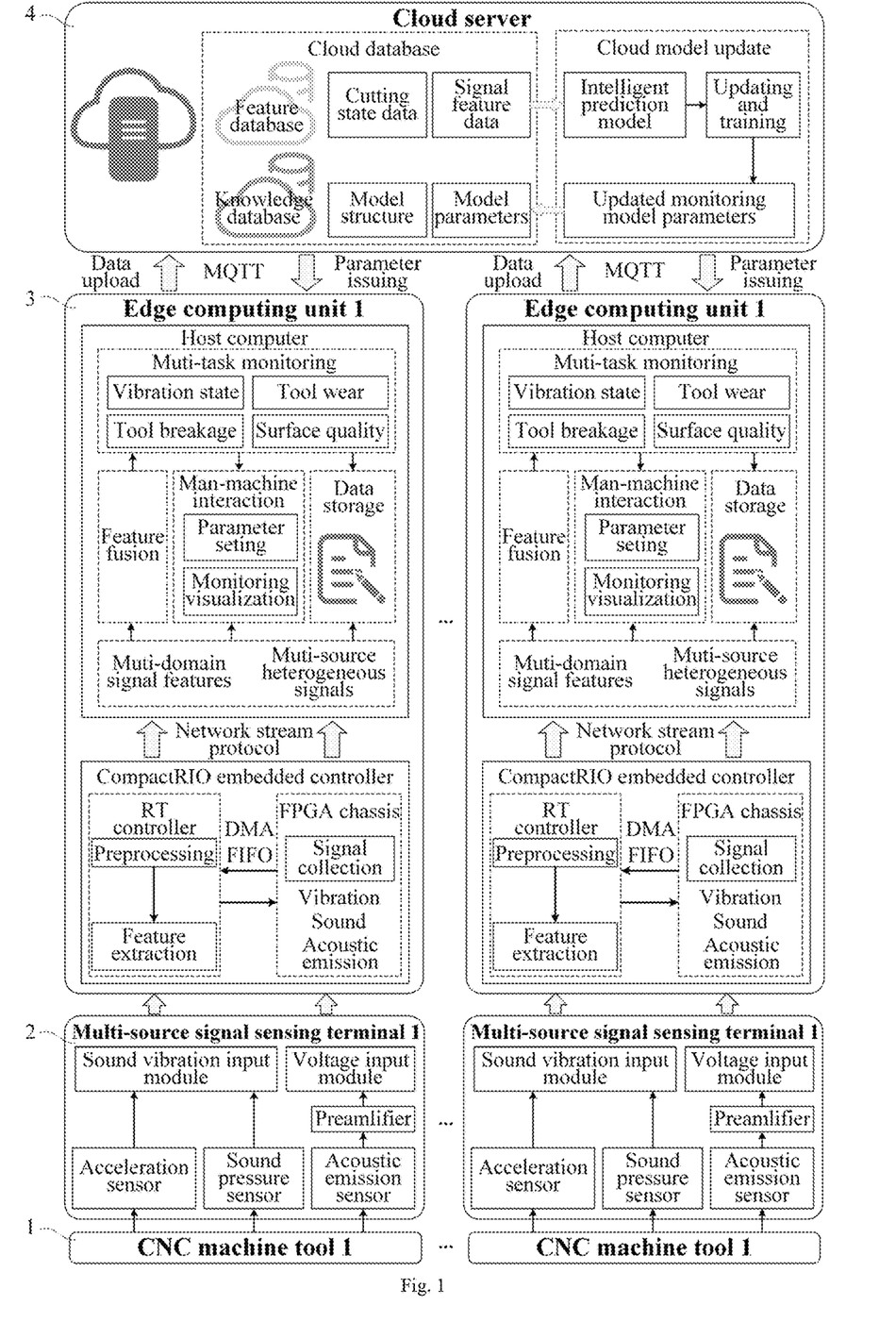
FIG. 1 is an architecture diagram of a multi-task machining process monitoring system of the present invention.

As shown in FIG. 1, a multi-task machining process on-line monitoring system based on cloud-edge collaboration, comprising multi-source sensing terminals 2, edge computing platforms 3 and a cloud server 4. Each multi-source sensing terminal is deployed on a machine tool 1, which comprises an three-axis acceleration sensor, a sound pressure sensor, an acoustic emission sensor, a preamplifier, a sound vibration input module and a voltage input module, and is used for obtaining three-directional spindle vibration signals, sound signals and acoustic emission signals in a machining process; each edge computing platform is built based on a CompactRIO embedded controller and a host computer, which comprises a signal collection module, a signal preprocessing module, a feature extraction module, a feature fusion module, a multi-task monitoring module, a data storage module, a man-machine interaction module and a cloud upload module, and is used for periodically collecting and processing the multi-source heterogeneous signals, monitoring a cutting machining process in real time in combination with intelligent prediction models, and uploading monitoring data to the cloud server; the cloud server comprises a cloud database module and a cloud model update module, wherein the cloud database module comprises a knowledge database and a feature database, and is used for storing the monitoring data sent by the edge computing platform, and updating and issuing the intelligent prediction models.

Figure 2:
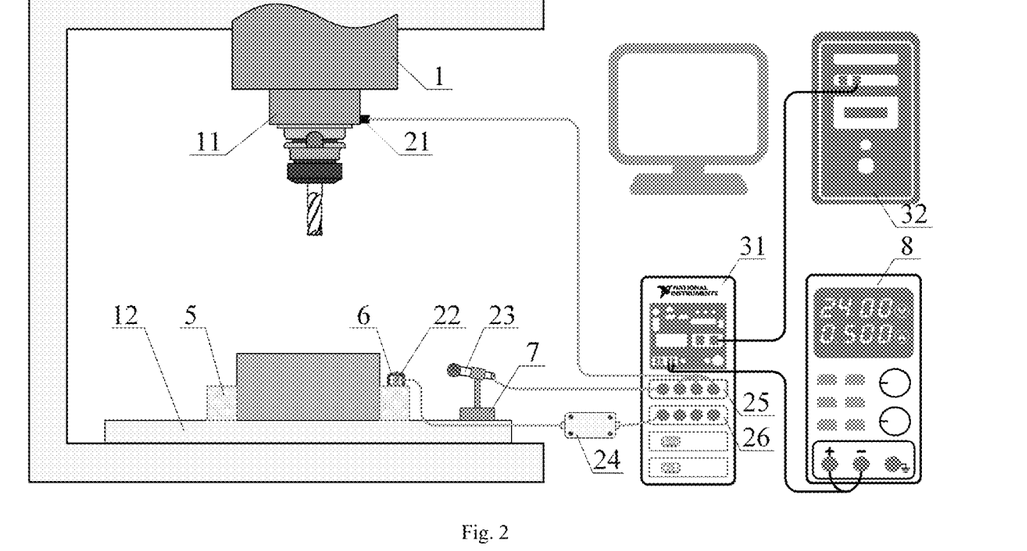
FIG. 2 is a schematic diagram of hardware installation and wiring of a multi-task machining process monitoring system.

In the present embodiment, system hardware is installed and wired by referring to FIG. 2; in order to avoid interference in the machining process, the three-axis acceleration sensor 21 is installed on a spindle 11 of the machine tool 1 by glue and is used for obtaining the vibration signals of the spindle in X, Y and Z directions in the machining process; the sound pressure sensor 23 is attached to a workbench 12 of the machine tool 1 through a magnetic stand 7 and is used for obtaining the sound signals in the machining process; the acoustic emission sensor 22 is installed on a workpiece fixture 5 through a magnetic clamp 6 and is used for obtaining the acoustic emission signals generated in the machining process; the three-axis acceleration sensor 21 and the sound pressure sensor 23 are connected to the sound vibration input module 25 through signal cables, the acoustic emission sensor 22 is connected to an input end of the preamplifier 24, and an output end of the preamplifier 24 is connected to the voltage input module 26. The CompactRIO embedded controller 31 is powered by a DC power supply 8, the sound input module 25 and the voltage input module 26 are directly inserted into clamp grooves of the CompactRIO embedded controller 31, and the CompactRIO embedded controller 31 is connected to the host computer 32 through a network cable.

The CompactRIO embedded controller is equipped with a FPGA chassis and a RT controller, data is transmitted between the CompactRIO embedded controller and the host computer through a network stream protocol, and data is transmitted between the FPGA chassis and the RT controller in a DMA FIFO mode; the signal collection module is deployed in the FPGA chassis, the signal preprocessing module and the feature extraction module are deployed in the RT controller, and the feature fusion module, the multi-task monitoring module, the data storage module, the man-machine interaction module and the cloud upload module are deployed in the host computer; the CompactRIO embedded controller and the host computer are developed based on a LabVIEW software platform, and a producer/consumer mode is adopted for LabVIEW program design, so as to improve the program operation efficiency and ensure the timeliness of the machining monitoring system; the signal collection module is a producer, and the signal preprocessing module, the feature extraction module, the feature fusion module, the multi-task monitoring module, the data storage module, the man-machine interaction module and the cloud upload module are consumers.

Figure 3:
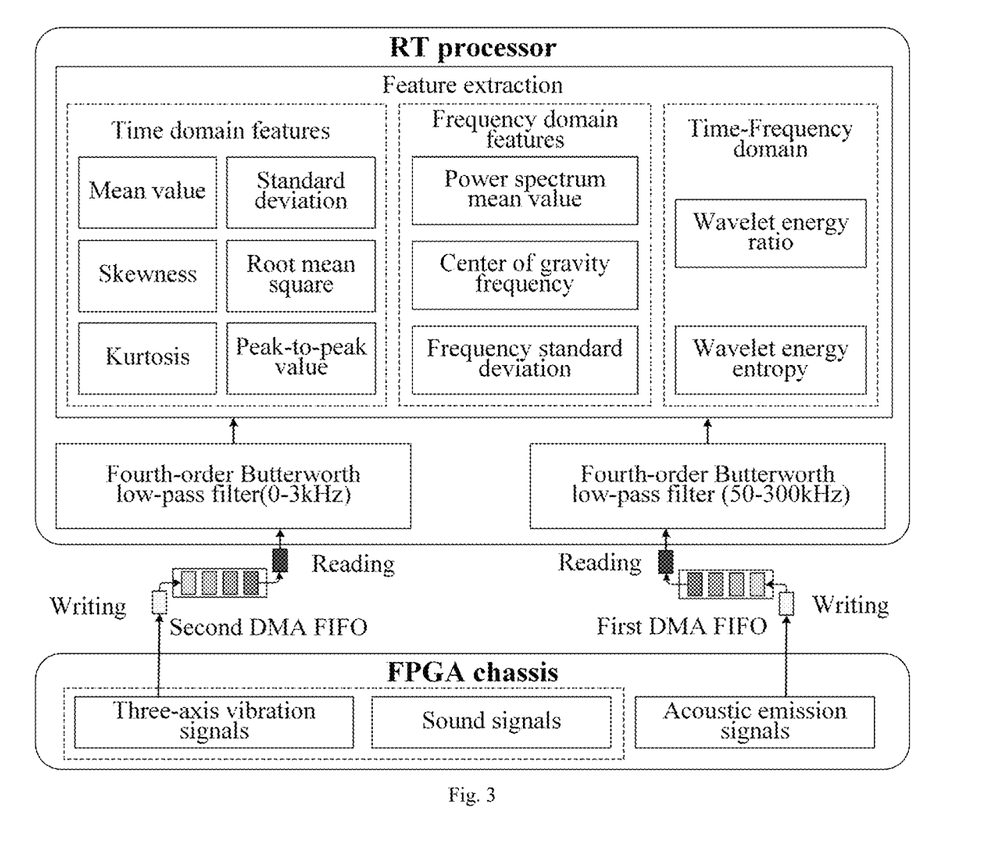
FIG. 3 a schematic diagram of data acquisition and processing of an edge controller.
Figure 4:
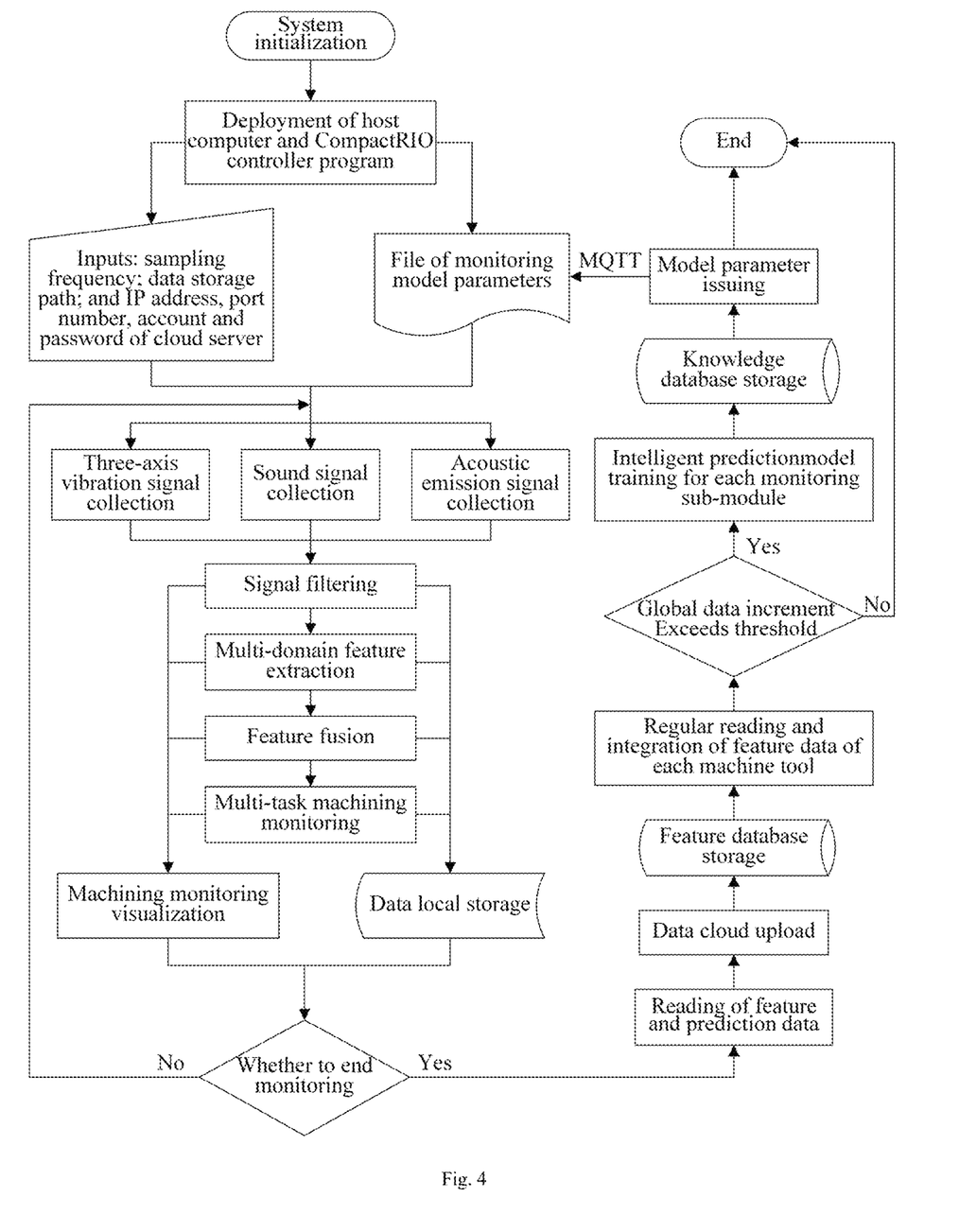
FIG. 4 is a flow chart of a multi-task machining process monitoring method based on cloud-edge collaboration.

As shown in FIG. 3, the three-directional spindle vibration signals and the sound signals obtained by the sound vibration input module are collected by the signal collection module deployed in the FPGA chassis at a preset sampling frequency, and are circularly written into a first DMA FIFO cache area; at the same time, the acoustic emission signals obtained by the voltage input module are collected and circularly written into a second DMA FIFO cache area. Data in the first DMA FIFO cache area and the second DMA FIFO cache area are circularly read by the signal preprocessing module deployed in the RT controller, the three-directional spindle vibration signals and the sound signals collected are filtered by a fourth-order Butterworth low-pass filter with a cutoff frequency of 3 kHz, at the same time, the acoustic emission signals collected are filtered by a fourth-order Butterworth band-pass filter with a passband range of 50 kHz-300 kHz, and only components of the acoustic emission signals associated with a cutting state are retained. Time domain features are extracted by the feature extraction module from the filtered vibration signals, sound signals and acoustic emission signals, including: mean value, standard deviation, root mean square, peak-to-peak value, skewness and kurtosis; frequency domain features are extracted, including: power spectrum mean value, center of gravity frequency, and frequency standard deviation; time-frequency domain features are extracted, including: wavelet energy ratio and wavelet energy entropy.

The feature fusion module uses a kernel principal component analysis algorithm to reduce the dimensionality of the received signal feature data, and principal components with a cumulative contribution rate of greater than 80% are selected to enhance the characterization capability of features and improve the accuracy and efficiency of machining state recognition.

The multi-task monitoring module comprises a vibration monitoring sub-module, a tool wear monitoring sub-module, a tool breakage monitoring sub-module and a machining quality monitoring sub-module; cutting vibration, tool wear, tool breakage and machining surface roughness are monitored by the above sub-modules according to respective intelligent prediction models; in the present embodiment, the intelligent prediction models of the vibration monitoring sub-module, the tool wear monitoring sub-module, the tool breakage monitoring sub-module and the machining quality monitoring sub-module are built by a support vector machine, initial model parameters are obtained by training through a MATLABLibsvm tool kit, each intelligent prediction model is realized in a MATLAB Script node of LabVIEW, the inputs of the models are features after dimensionality reduction by the feature fusion module, and the outputs are a vibration state (steady state, early flutter state or severe flutter state), a tool wear state (initial wear, normal wear or severe wear), a tool breakage state (normal state or damage state) and machining surface roughness, respectively.

Data with consistent timestamps is stored into the same text file by the data storage module, and the file is named as "data type"+"date". First, the data to be stored and timestamps thereof are converted into strings; then, the above strings are concatenated with spaces as separators; finally, the concatenated string is stored in a text file under a specified path. In the present embodiment, the three-axis vibration signals and the sound signals are stored in the same file, the signal features and the monitoring results are stored in the same file, and the acoustic emission signals are stored separately.

The man-machine interaction module comprises a parameter setting interface and a monitoring visualization interface, the parameter setting interface is used for the configuration of various monitoring parameters and cloud server information, and the monitoring visualization interface is used for the real-time display of the multi-source heterogeneous signals, the features and the monitoring results. In the present embodiment, the parameter setting interface and the monitoring visualization interface can be switched freely through tabs at the top; the parameter setting interface is built by input controls, a Boolean button and a Boolean indicator light; the input controls include a sound vibration signal sampling frequency input control, an acoustic emission signal sampling frequency input control, a data storage path input control, and a cloud server IP address, port number, account and password input control; the Boolean button is used for connecting the cloud server, and the Boolean indicator light is used for displaying a connection state of the cloud server. The monitoring visualization interface is provided with a signal display unit, a feature display unit and a monitoring result display unit side by side; the signal display unit and the feature display unit are built by waveform chart controls and are used for displaying the collected three-directional vibration signals, sound signals and acoustic emission signals as well as the corresponding time domain features, frequency domain features and time-frequency domain features thereof in real time; the monitoring result display unit uses the Boolean indicator light to indicate the cutting state, the waveform chart controls are used for displaying predicted machining roughness, and a state label corresponding to an illuminated Boolean indicator light is a predicted cutting state.

The text files used for storing the feature data and the monitoring results are read by the cloud upload module, strings read are converted into json strings, and the json strings are published to the cloud server through a built MQTT server.

The cloud server is built based on an Alibaba Cloud platform, the cloud database module is built by a MySQL database and comprises the knowledge database and the feature database, the cloud server subscribes to the data published by the host computer of each edge computing platform, the feature data and the monitoring results are stored in a specified table of the feature database by an SQL insert statement, the table is named as "machine tool number"+"date", and the SQL statements are compiled to create a new data table to enable daily machine tool monitoring data to be stored in the specified table; the model parameters of the support vector machine of each sub-module of the multi-task monitoring module are stored in the specified table by the knowledge database, and the table is named as "sub-module name"; the feature database is regularly accessed by the cloud model update module to integrate the feature data of each machine tool, activate a model update function when global data increment of the feature database exceeds a set threshold, train the model of the support vector machine of each sub-module, store the updated model parameters in the corresponding table of the knowledge database, and issue the parameters to the host computer of each edge computing platform through the MQTT protocol.

Embodiment 2

A multi-task machining process on-line monitoring method based on cloud-edge collaboration, which adopts the multi-task machining process on-line monitoring system based on cloud-edge collaboration in embodiment 1, comprising the following specific implementation steps:

S1. Program deployment and setting; deploying a LabVIEW program of the edge computing platform, and setting a sampling frequency, a data storage path, cloud server information, etc. in the man-machine interaction module;

In the present embodiment, the sampling frequency of sound vibration signals is set to 10,240 Hz, the sampling frequency of the acoustic emission signals is set to 1 MHz, and the data storage path is named as "date"+"data type"; the IP address, the port number, the account and the password of the cloud server are set based on an Alibaba cloud server built; the button for cloud server connection is clicked; when the Boolean indicator light is illuminated, it indicates that the cloud server is successfully connected; otherwise, the cloud server is checked for correct information setting and modified for reconnection until the cloud server is successfully connected.

S2. Multi-source heterogeneous signal collection; using the signal collection module to collect spindle vibration signals, sound signals and acoustic emission signals obtained by the multi-source sensing terminal at a preset sampling frequency, and transmit the signals collected to the signal preprocessing module;

In the present embodiment, the three-directional spindle vibration signals, the sound signals and the acoustic emission signals are collected by the signal collection module at a preset sampling frequency; the three-directional spindle vibration signals and the sound signals are circularly written into a first DMA FIFO cache area; at the same time, the acoustic emission signals are circularly written into a second DMA FIFO cache area; the time interval between two adjacent writings is 50 ms.

S3. Signal filtering and multi-domain feature extraction; using the signal preprocessing module to filter the collected three-directional spindle vibration signals, sound signals and acoustic emission signals, inputting the filtered data to the feature extraction module to extract time domain features, frequency domain features and time-frequency domain features therefrom, and on this basis, transmitting the filtered multi-source heterogeneous signals and the extracted multi-domain signal features to the host computer through a network stream protocol; in the present embodiment, the data in the first DMA FIFO cache area read are input to a fourth-order Butterworth low-pass filter with a cutoff frequency of 3 kHz by the signal preprocessing module; at the same time, the data in the second DMA FIFO cache area read are input to a fourth-order Butterworth band-pass filter with a passband range of 50 kHz-300 kHz; the filtered multi-source heterogeneous signals are input to the feature extraction module to extract and obtain mean value, standard deviation, root mean square, peak-to-peak value, skewness, kurtosis, power spectrum mean value, center of gravity frequency, frequency standard deviation, wavelet energy ratio and wavelet energy entropy; finally, the filtered signals and the extracted feature data are sent to the host computer by the CompactRIO embedded controller through the network stream protocol.

S4. Feature fusion and multi-task machining monitoring; using the host computer to input the read feature data to the feature fusion module for dimensionality reduction, and then input the low dimensional features to the multi-task monitoring module to predict a cutting vibration state, a tool wear state, a tool breakage state and machining surface roughness;

In the present embodiment, the signals and feature data sent by the CompactRIO embedded controller are monitored by the host computer in real time, and the filtered signal data is written into two queues and transmitted to the man-machine interaction module and the data storage module, respectively; the feature data is written into three queues, wherein two queues are transmitted to the man-machine interaction module and data storage module, respectively, and the other queue is input to the feature fusion module; four-dimensional eigenvectors are obtained after dimensionality reduction by kernel principal component analysis and input to the MATLAB Script node of each sub-module of the multi-task monitoring module; the pre-trained model of the support vector machine is used to predict the present machining state and surface roughness, and the prediction results are written into two queues and input to the man-machine interaction module and the data storage module, respectively;

S5. Data visualization and local storage; transmitting the filtered signals, the extracted features and the monitoring results to the man-machine interaction module and the data storage module for real-time display and storage in a text file under a specified path;

In the present embodiment, the signals, features and prediction data in the queues are read by the man-machine interaction module and displayed in real time in the monitoring visualization interface with the help of a waveform icon control. Taking the sound vibration signals as an example, the specific storage procedure is as follows: first, timestamps, the three-directional spindle vibration signals and the sound signals are converted into strings; then, the strings are concatenated into one string with spaces as separators; subsequently, the concatenated string is stored in a text file; the first column of the text file is for the timestamps, the second to the fourth columns are corresponding to the spindle vibration signals in the X, Y and Z directions, respectively, and the fifth column is for the sound signals.

S6. Repeating steps S2-S5 until the end of a machining monitoring process;

S7. Data cloud upload; after machining monitoring is ended, using the cloud upload module to read the text file used for storing the feature data and the monitoring results in the host computer, send the read data to the cloud server through a MQTT protocol, and delete the corresponding text file to release the disk space of the host computer after the data is successfully uploaded;

In the present embodiment, a text reading function is called by the cloud upload module to read the text file of the feature and prediction data, strings read are converted into json strings line by line, and the json strings are published to the cloud server through a built MQTT server.

S8. Cloud database storage; using the cloud server to accept the feature and prediction data sent by each edge computing platform, and store the data in a specified feature database;

In the present embodiment, a python script is used by the cloud server to realize MQTT subscription and receiving as well as MySQL database storage; whenever a new message is published to a subscribed MQTT topic, the subscribed data is stored in a specified table of the feature database through an SQL insert statement.

S9. Model cloud update and issuing; using the cloud model update module to regularly access the feature database, respectively train the intelligent prediction models of the vibration monitoring sub-module, the tool wear monitoring sub-module, the tool breakage monitoring sub-module and the machining quality monitoring sub-module when global data increment of the feature database reaches a set threshold, store the updated model parameters in the knowledge database, and issue the parameters to the host computer of each edge computing platform at the same time through the MQTT protocol;

In the present embodiment, a python script is used by the cloud server to realize regular reading of the feature database, model update of the support vector machine of each monitoring sub-module, storage of the model parameters, and MQTT publication; the feature database is read every 12 hours to integrate the feature data of each machine tool, judge whether the global data increment exceeds a set threshold, and activate a model update function when the threshold is exceeded; the updated parameters are stored in the corresponding table of the knowledge database through an SQL replacement statement; at the same time, the parameters are converted into json format and then published to the host computer of each edge device through the MQTT protocol.

The invention claimed is:
1. A multi-task machining process on-line monitoring system based on cloud-edge collaboration, comprising multi-source sensing terminals, edge computing platforms and a cloud server, wherein:
each multi-source sensing terminal is deployed on a machine tool, and is used for obtaining multi-source heterogeneous signals generated in a machining process and transmitting the signals to each edge computing platform;

the edge computing platform is built based on a CompactRIO embedded controller and a host computer, which is used for periodically collecting and processing the multi-source heterogeneous signals, monitoring a cutting machining process in real time in combination with intelligent prediction models, and uploading monitoring data to the cloud server;

the cloud server is used for storing the monitoring data sent by the edge computing platform, and updating and issuing the intelligent prediction models;

the edge computing platform comprises a signal collection module, a signal preprocessing module, a feature extraction module, a feature fusion module, a multi-task monitoring module, a data storage module, a man-machine interaction module and a cloud upload module; the signal collection module is used for collecting spindle vibration signals, sound signals and acoustic emission signals obtained by the multi-source sensing terminal at a preset sampling frequency, and transmitting the above signals to the signal preprocessing module; the signal preprocessing module is used for low-pass filtering of the collected spindle vibration signals and sound signals, and band-pass filtering of the collected acoustic emission signals; the feature extraction module is used for extracting time domain, frequency domain and time-frequency domain features from the filtered multi-source heterogeneous signals; the feature fusion module is used for reducing the dimensionality of the extracted time domain, frequency domain and time-frequency domain features; the multi-task monitoring module comprises a vibration monitoring sub-module, a tool wear monitoring sub-module, a tool breakage monitoring sub-module and a machining quality monitoring sub-module; cutting vibration, tool wear, tool breakage and machining surface roughness are monitored by the above sub-modules according to respective intelligent prediction models; the data storage module is used for storing the multi-source heterogeneous signals preprocessed by the signal preprocessing module, the signal features extracted by the feature extraction module and the monitoring results of the multi-task monitoring module to the host computer, so as to facilitate the playback of historical monitoring data and the tracing of processing anomalies; the man-machine interaction module comprises a parameter setting interface and a monitoring visualization interface, the parameter setting interface is used for the configuration of various monitoring parameters and cloud server information, and the monitoring visualization interface is used for the real-time display of the signals, the features and the monitoring results; and the cloud upload module is used for uploading the feature data and monitoring results stored in the host computer to the cloud server through a MQTT protocol.

2. The multi-task machining process on-line monitoring system according to claim 1, wherein the multi-source sensing terminal comprises an acceleration sensor, a sound pressure sensor, an acoustic emission sensor, a preamplifier, a sound vibration input module and a voltage input module, and the multi-source heterogeneous signals obtained include the spindle vibration signals, the sound signals and the acoustic emission signals.

3. The multi-task machining process on-line monitoring system according to claim 1, wherein the signal collection module is deployed in a FPGA chassis of the CompactRIO embedded controller, and the signal preprocessing module and the feature extraction module are deployed in an RT controller of the CompactRIO embedded controller; the feature fusion module, the multi-task monitoring module, the data storage module, the man-machine interaction module and the cloud upload module are deployed in the host computer; data is transmitted between the FPGA chassis and the RT controller in a DMA FIFO mode, and data is transmitted between the CompactRIO embedded controller and the host computer through a network stream protocol.

4. The multi-task machining process on-line monitoring system according to claim 3, wherein the CompactRIO embedded controller and the host computer are developed based on a LabVIEW software platform, and a producer/consumer mode is adopted for LabVIEW program design, so as to improve the program operation efficiency and ensure the timeliness of the machining monitoring system; the signal collection module is a producer, and the signal preprocessing module, the feature extraction module, the feature fusion module, the multi-task monitoring module, the data storage module, the man-machine interaction module and the cloud upload module are consumers.

5. The multi-task machining process on-line monitoring system according to claim 1, wherein the intelligent prediction models of the vibration monitoring sub-module, the tool wear monitoring sub-module, the tool breakage monitoring sub-module and the machining quality monitoring sub-module are built by an on-line sequential extreme learning machine or a support vector machine, the inputs of the models are features after dimensionality reduction by the feature fusion module, and the outputs are a vibration state, a tool wear state, a tool breakage state and machining surface roughness, respectively; each intelligent prediction model is realized in a MATLAB Script node of LabVIEW.

6. The multi-task machining process on-line monitoring system according to claim 1, wherein the cloud server comprises a cloud database module and a cloud model update module; the cloud database module comprises a knowledge database and a feature database, the knowledge database is used for storing the intelligent prediction model of each sub-module of the multi-task monitoring module, and the feature database is used for storing the feature data and monitoring results sent by each edge computing platform; the cloud model update module is used for updating and training the intelligent prediction model of each sub-module of the multi-task monitoring module when global data of the feature database reaches a set threshold, storing the updated model parameters in the knowledge database of the cloud database module, and issuing the model to each edge computing platform at the same time.

7. A multi-task machining process on-line monitoring method based on cloud-edge collaboration of the multi-task machining process on-line monitoring system according to claim 6, comprising the following steps:

S1. program deployment and setting; deploying a LabVIEW program of the edge computing platform, and setting a sampling frequency, a data storage path and cloud server information in the man-machine interaction module;

S2. multi-source heterogeneous signal collection; using the signal collection module to collect spindle vibration signals, sound signals and acoustic emission signals obtained by the multi-source sensing terminal at a preset sampling frequency, and transmit the signals collected to the signal preprocessing module;

S3. signal filtering and multi-domain feature extraction; using the signal preprocessing module to filter the collected spindle vibration signals, sound signals and acoustic emission signals, inputting the filtered data to the feature extraction module to extract time domain features, frequency domain features and time-frequency domain features therefrom, and transmitting the filtered multi-source heterogeneous signals and the extracted multi-domain signal features to the host computer through a network stream protocol;

S4. feature fusion and multi-task machining monitoring; using the host computer to input the read feature data to the feature fusion module for dimensionality reduction, and then input the low dimensional features to the multi-task monitoring module to predict a cutting vibration state, a tool wear state, a tool breakage state and machining surface roughness;

S5. data visualization and local storage; transmitting the filtered signals, the extracted features and the monitoring results to the man-machine interaction module and the data storage module for real-time display and storage in a text file under a specified path;

S6. repeating steps S2-S5 until the end of a machining monitoring process;

S7. data cloud upload; after machining monitoring is ended, using the cloud upload module to read the text file used for storing the feature data and the monitoring results in the host computer, send the read data to the cloud server through a MQTT protocol, and delete the corresponding text file to release the disk space of the host computer after the data is successfully uploaded;

S8. cloud database storage; using the cloud server to accept the feature and prediction data sent by each edge computing platform, and store the data in a specified feature database;

S9. model cloud update and issuing; using the cloud model update module to regularly access the feature database, respectively train the intelligent prediction models of the vibration monitoring sub-module, the tool wear monitoring sub-module, the tool breakage monitoring sub-module and the machining quality monitoring sub-module when global data increment of the feature database reaches a set threshold, store the updated model parameters in the knowledge database, and issue the parameters to the host computer of each edge computing platform at the same time through the MQTT protocol.

* * * * *